United States Patent
Migne et al.

(10) Patent No.: US 10,435,180 B2
(45) Date of Patent: Oct. 8, 2019

(54) METHOD FOR ADJUSTING THE POSITION OF ELEMENTS OF A STRUCTURE OF AN AIRCRAFT, AND DEVICE FOR IMPLEMENTING SAME

(71) Applicant: Airbus Operations SAS, Toulouse (FR)

(72) Inventors: Janick Migne, Saint Nazaire (FR); Laurent Serrano, Indre (FR); Jean-Marc Breton, Pornic (FR); Jean-Christophe Bry, Campbon (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 207 days.

(21) Appl. No.: 15/619,950

(22) Filed: Jun. 12, 2017

(65) Prior Publication Data
US 2017/0355472 A1     Dec. 14, 2017

(30) Foreign Application Priority Data

Jun. 13, 2016 (FR) ...................................... 16 55419

(51) Int. Cl.
| | | |
|---|---|---|
| *G06K 9/00* | (2006.01) | |
| *B64F 5/10* | (2017.01) | |
| *B64C 1/06* | (2006.01) | |

(52) U.S. Cl.
CPC ................ *B64F 5/10* (2017.01); *B64C 1/068* (2013.01)

(58) Field of Classification Search
CPC combination set(s) only.
See application file for complete search history.

(56) References Cited

U.S. PATENT DOCUMENTS

| | | | |
|---|---|---|---|
| 5,973,788 A | 10/1999 | Pettersen et al. | |
| 8,849,636 B2 * | 9/2014 | Becker | B64F 5/00 345/419 |

(Continued)

FOREIGN PATENT DOCUMENTS

| | | |
|---|---|---|
| FR | 3029897 | 6/2016 |
| WO | 9714015 | 4/1997 |

OTHER PUBLICATIONS

French Search Report, dated Mar. 6, 2017, priority document.

*Primary Examiner* — Jose L Couso
(74) *Attorney, Agent, or Firm* — Greer, Burns & Crain, Ltd.

(57) ABSTRACT

A device for adjusting the position of structural elements of a structure of an aircraft, comprising a measurement tool for determining a value for the actual position of each structural element, a processing and calculation system for comparing each value of the actual position determined by the analysis system with a corresponding theoretical value, and for determining therefrom an adjustment value, an adjustment tool configured to be attached in use to a structural element, comprising at least one measurement sensor configured to measure a distance between the measurement sensor and the structural element, a calculator for comparing the value measured by the measurement sensor with the corresponding adjustment value, and for deriving therefrom corrective actions to finalize adjustment of the structural element, and a communication system for exchanging information between the adjustment tool and the processing and calculation system.

13 Claims, 2 Drawing Sheets

(56) References Cited

U.S. PATENT DOCUMENTS

| | | | |
|---|---|---|---|
| 2010/0320327 A1* | 12/2010 | Sayilgan | B64C 1/18 |
| | | | 244/131 |
| 2012/0303336 A1 | 11/2012 | Becker et al. | |
| 2013/0192045 A1* | 8/2013 | Meyer | G01C 15/02 |
| | | | 29/464 |
| 2015/0356236 A1* | 12/2015 | Bense | G06F 17/5095 |
| | | | 703/8 |
| 2016/0167809 A1 | 6/2016 | Jurbert et al. | |
| 2017/0239722 A1* | 8/2017 | Goehlich | B33Y 10/00 |
| 2017/0240298 A1* | 8/2017 | Goehlich | B33Y 10/00 |
| 2017/0247121 A1* | 8/2017 | Guering | B64F 5/10 |

* cited by examiner

METHOD FOR ADJUSTING THE POSITION OF ELEMENTS OF A STRUCTURE OF AN AIRCRAFT, AND DEVICE FOR IMPLEMENTING SAME

CROSS-REFERENCES TO RELATED APPLICATIONS

This application claims the benefit of the French patent application No. 1655419 filed on Jun. 13, 2016, the entire disclosures of which are incorporated herein by way of reference.

BACKGROUND OF THE INVENTION

The present application relates to a method for adjusting the position of elements of a structure of an aircraft, and to a device for implementing this method.

An aircraft fuselage comprises, on one hand, a primary structure which comprises stiffeners such as frames and stringers and a skin that is attached to the stiffeners and, on the other hand, a secondary structure which comprises walls, partitions, storage bins or other elements which are connected to the primary structure. To that end, the primary structure comprises supports to which the various parts of the secondary structure are attached. In order that the parts of the secondary structure are correctly positioned in the fuselage, it is necessary for the supports themselves to be correctly positioned. Thus, each support must occupy an actual position, in an aircraft reference frame, that matches a theoretical position determined during design of the aircraft.

However, after assembly of the primary structure, certain supports occupy an actual position, in the aircraft reference frame, that differs from the theoretical position. Consequently, the process of assembling an aircraft comprises at least one phase of adjusting the position of these supports in order to bring the actual position of each one into line with the theoretical position.

According to one known approach, a measurement device of the laser tracker type is positioned in the fuselage, more particularly in a service platform, at the rear of the fuselage. This laser tracker is configured to measure the actual position of each element in the aircraft reference frame. Each element is scanned to determine its actual position in the airplane reference frame and, if the measured actual position is not in accordance with the theoretical position, the position of the measured element is corrected using the values provided by the laser tracker. Thus, the steps of measuring the actual position and adjusting the position are carried out using the same measurement device and are repeated for each structural element.

As a result, this adjustment phase is relatively long, greater than 10 hours, which affects the rhythm of aircraft assembly.

In order to reduce the duration of this adjustment phase, one solution involves using two laser trackers positioned at either end of the fuselage segment in order to split the fuselage segment into two working areas, with an operator working in each area. Thus, a first operator adjusts the position of certain elements with a first laser tracker while a second operator adjusts the position of other elements with a second laser tracker.

This solution is not satisfactory as it requires the use of two laser trackers, which are instruments that require very stable operating conditions. In particular, it is necessary for there to be no vibration in the working area during adjustment. Moreover, using two laser trackers is a solution that is not simple to implement, in particular at the boundary between the working areas. Finally, as above, each operator must successively measure and possibly correct the position of each structural element.

The present invention aims to remedy the drawbacks of the prior art.

SUMMARY OF THE INVENTION

To that end, the invention relates to a device for adjusting the position of structural elements of a structure of an aircraft, comprising:

a measurement tool comprising:

at least one pair of imaging devices that are configured to capture an image of the structural elements;

an analysis system that is configured to determine, from the images captured by the imaging devices, a value for the actual position of each structural element;

a processing and calculation system that is configured to compare each value of the actual position determined by the analysis system with a corresponding theoretical value, and to determine therefrom an adjustment value;

an adjustment tool that is configured to be attached in use to a structural element, comprising:

at least one measurement sensor that is configured to measure a distance between the measurement sensor and the structural element;

a calculator for comparing the value measured by the measurement sensor with the corresponding adjustment value, and for deriving therefrom corrective actions to finalize adjustment of the structural element, and a communication system for exchanging information between the adjustment tool and the processing and calculation system.

In order to automatically adjust the position of the structural elements, the device further cooperates with automated positioning means.

In order to inform an operator of the manner in which the structural element in question is to be moved, the device comprises an output interface for outputting the adjustment values. This makes it possible for the operator to manually modify the position of the structural element or to monitor the progression of an automated positioning.

According to one embodiment of the invention, the man-machine output interface is a screen.

In order to adequately position and orient the at least one measurement sensor around the structural element, the adjustment tool may comprise a support on which the at least one measurement sensor is attached, and a removable connection system by means of which it is possible to connect the support to the structure, the measurement sensor pointing toward the structural element.

When the adjustment tool comprises at least two measurement sensors, each measurement sensor may be attached to the support such that the direction of measurement of each measurement sensor is neither parallel with nor intersects the axis of rotation of the adjustment orientation of a structural element.

In order to cover a large structure, the measurement tool may comprise two pairs of imaging devices.

According to one embodiment of the invention, the measurement sensor is an opto-electrical sensor.

The invention also relates to a method for adjusting the position of structural elements of a structure of an aircraft, implemented by a device for adjusting the position of structural elements of a structure of an aircraft. The method comprises the following steps:

determining a value for the actual position of structural elements of the aircraft structure by means of the measurement tool;

determining at least one adjustment value on the basis of the previously determined value of the actual position and a theoretical position of a structural element, by means of the processing and calculation system;

measuring, by means of the adjustment tool, a distance between a measurement sensor and the structural element, and comparing this value with the adjustment value, and deriving corrective actions until the values measured by the measurement sensor(s) match the determined adjustment values.

Moreover, positioning of the structural elements can be automated, and hence the method may comprise a step of sending the adjustment values to automated positioning means.

According to one advantageous variant, the method may comprise a step of drawing up a report of the adjustment operations when the values measured by the measurement sensor(s) match the determined adjustment values, and/or a step of outputting the adjustment value and/or the report of the adjustment operations by means of a man-machine output interface.

BRIEF DESCRIPTION OF THE DRAWINGS

Other characteristics and advantages will emerge from the following description of the invention, which description is given solely by way of example, with reference to the appended drawings in which.

DETAILED DESCRIPTION OF THE PREFERRED EMBODIMENTS

Figure 1:
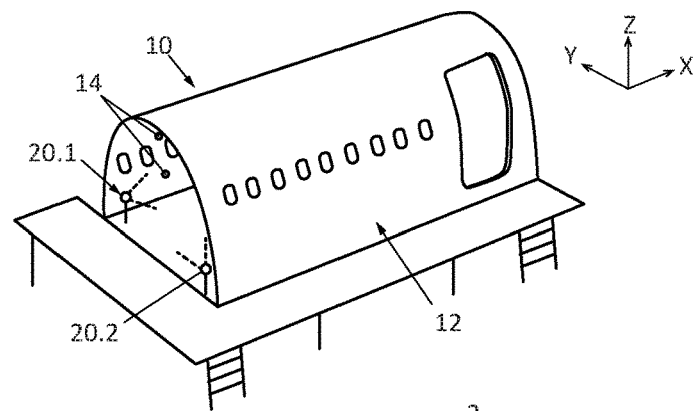
FIG. 1 is a perspective view of a fuselage segment.
Figure 2:
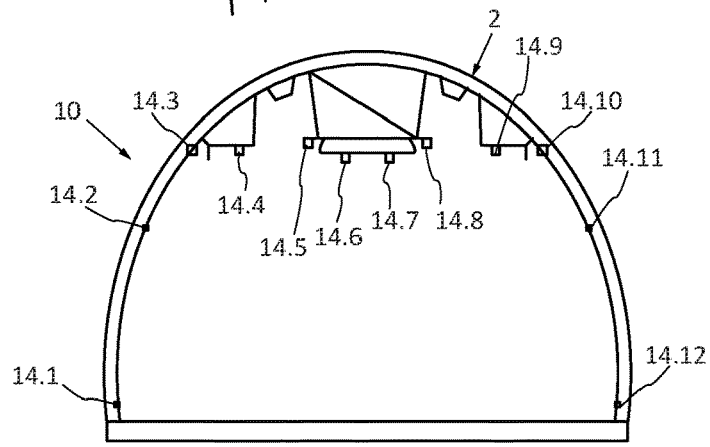
FIG. 2 is a cross section of the fuselage segment of FIG. 1.
Figure 3:
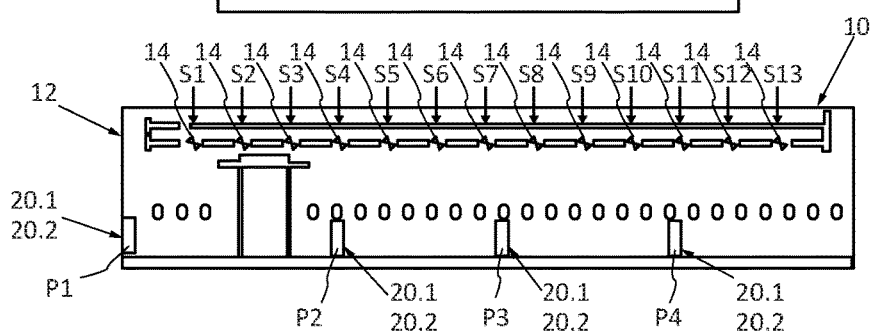
FIG. 3 is a longitudinal section of the fuselage segment of FIG. 1.

FIGS. 1 to 3 show a segment of a fuselage 10 which comprises a structure 12 that comprises structural elements 14 whose position is to be adjusted.

These structural elements 14 are positioned in an aircraft reference frame XYZ.

According to one configuration, the aircraft reference frame comprises three orthonormal axes X, Y and Z, wherein the X-axis is parallel to the length of the fuselage segment, the Y-axis is perpendicular to the X-axis and horizontal, and the Z-axis is perpendicular to the X-axis and vertical.

Each structural element 14 occupies an actual position, in the aircraft reference frame XYZ, that must match a theoretical position determined during design of the aircraft.

Thus, the actual or theoretical position of each structural element 14 is determined by means of at least one actual or theoretical value in the aircraft reference frame XYZ. This actual or theoretical value can be a distance, an angle, etc.

According to one configuration, in the aircraft reference frame XYZ, the actual (or theoretical) position of a structural element 14.1 is determined by means of a first actual (or theoretical) value X1, a second actual (or theoretical) value Y1 and a third actual (or theoretical) value Z1. The theoretical values of the theoretical positions of each structural element are catalogued in a first database 15. According to one embodiment, for the theoretical position of each structural element 14, the first database comprises three values Xth, Yth, Zth.

According to one application, the structural elements 14 are positioned inside the fuselage segment 10 and are supports of a primary structure used to attach parts of a secondary structure to the primary structure.

According to a configuration shown in FIG. 3, the structure 12 of the fuselage segment 10 comprises multiple sections S1 to S13 comprising at least one structural element 14. As shown in FIG. 2, each section S1 to S13 comprises multiple structural elements 14.1 to 14.12.

By way of example, the fuselage section 10 comprises one hundred and sixty structural elements.

Figure 10:
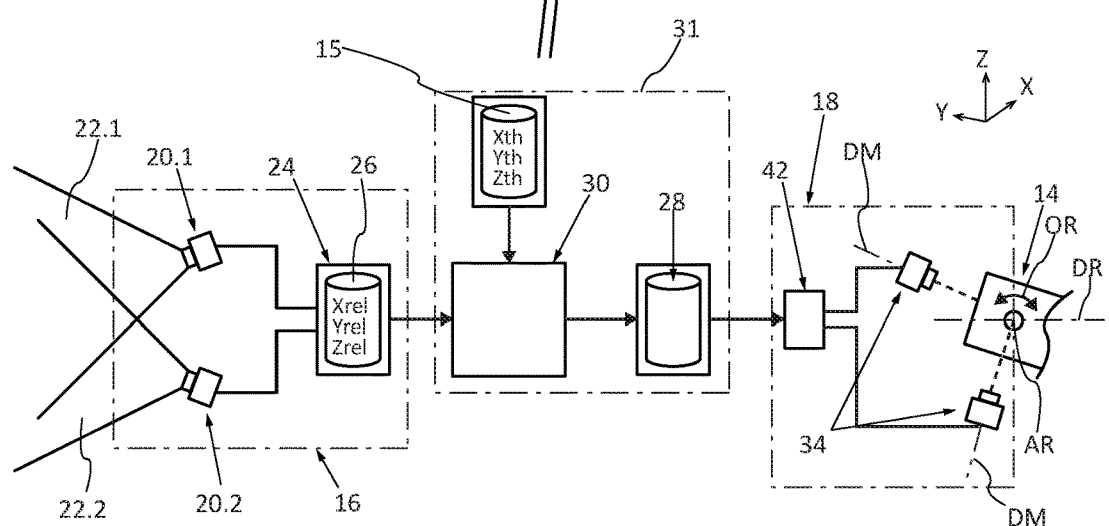
FIG. 10 is an overview of the adjustment method which illustrates the invention.

As shown in FIG. 10, the position of each structural element 14 can be adjusted with respect to at least one adjustment direction DR in the aircraft reference frame XYZ and/or with respect to at least one adjustment orientation OR which corresponds to a rotation about an axis of rotation AR. The direction DR and the axis of rotation AR each comprise at least one component on the X-axis, on the Y-axis and/or on the Z-axis.

For some structural elements 14, the direction DR is contained in a transverse plane (perpendicular to the X-axis).

The method for adjusting the position of the structural elements 14 of the structure 12 comprises:

a first step of measuring the actual positions of the structural elements 14, a second step of determining, for each structural element 14, at least one adjustment value on the basis of the measured actual position and its theoretical position, and a third step of adjusting each structural element 14 depending on the determined adjustment value.

According to one aspect of the invention, the steps of measuring the actual position and of adjusting are separate. In the first step, the actual positions of all of the structural elements 14 are measured using a measurement tool 16. In the third step, all of the structural elements 14 are adjusted in turn using adjustment tools 18.

The first step of measuring the actual positions of the structural elements 14 is carried out by photogrammetry.

To that end, the measurement tool 16 comprises at least one pair of imaging devices 20.1 and 20.2 that are positioned in the aircraft reference frame XYZ such that their fields of view 22.1 and 22.2 overlap, and a system 24 for analyzing the images taken by the pair of imaging devices 20.1 and 20.2. For each pair, the imaging devices 20.1 and 20.2 are configured to permit measurement by photogrammetry.

According to one embodiment, the measurement tool 16 comprises two pairs of imaging devices 20.1, 20.2. The number of pairs of imaging devices depends, in particular, on the dimensions of the structure 12, the required precision and the time allocated to measurement and adjustment of the structural elements.

Each imaging device 20.1, 20.2 is positioned in the aircraft reference frame XYZ in accordance with at least one reference position.

According to a first mode of operation, a single image from each imaging device 20.1 and 20.2 is sufficient to measure the actual positions of all of the structural elements 14. In this case, each imaging device 20.1 and 20.2 is positioned in accordance with a single reference position.

According to another mode of operation, multiple images are necessary in order to measure the actual positions of all of the structural elements 14. In this case, each imaging device 20.1 and 20.2 is positioned successively in accordance with multiple reference positions.

To give an indication, it is appropriate to allow approximately 10 seconds for each image and approximately 5 minutes to install the imaging devices 20.1 and 20.2.

By way of indication, for a fuselage section, it is appropriate to allow four images for each device 20.1 and 20.2 in order to measure the actual position of the structural elements 14 that are positioned on the thirteen sections. Thus, each imaging device 20.1 and 20.2 is positioned in accordance with four reference positions P1 to P4, as shown in FIG. 3.

The analysis system 24 is configured to generate, on the basis of the images and the reference positions of the imaging devices 20.1 and 20.2, a second database 26 containing, for each structural element 14, at least one value for its actual position in the aircraft reference frame XYZ. According to one embodiment, for the actual position of each structural element, the second database 26 comprises three values Xrel, Yrel, Zrel.

To that end, the analysis system 24 comprises software that is configured to determine at least one value for the actual position of each structural element on the basis of the images taken by the imaging devices 20.1 and 20.2.

To make it easier to determine the values of the actual position, in the aircraft reference frame XYZ, of the structural elements 14, at least one structural element 14 is equipped with a reflector. By way of example, this reflector is positioned on the structural element by means of a magnetic or elastic clamping system.

According to one variant embodiment, the first photogrammetry step is preceded by a preparatory step prior to imaging by the imaging devices 20.1 and 20.2, which comprises measuring points that are secured to the structure 12, are fixed in the aircraft reference frame XYZ and will be identifiable in the images taken subsequently. According to one embodiment, the measurements of the preparatory step are taken using a measurement device of the laser tracker type. The points measured may be structural elements 14.

In the second step of determining the adjustment values, each measured actual value is compared with the corresponding theoretical value, for each structural element 14. If the measured actual value differs from the corresponding theoretical value, an adjustment value is determined. According to one configuration, this adjustment value is equal to the difference between the measured actual value and the theoretical value.

Proceeding from this second step, a third database 28 is created, which contains the determined adjustment values.

In addition to the measurement tool 16 and the adjustment tools 18, the measurement and adjustment device which can be used to implement the method according to the invention comprises a processing and calculation system 30 which comprises software that is configured to compare each measured actual value with the corresponding theoretical value, and to derive therefrom an adjustment value.

This processing and calculation system 30 is a computer 31 which can also act as the analysis system 24. This computer 31 can also hold the three databases 15, 26 and 28.

Figure 4:
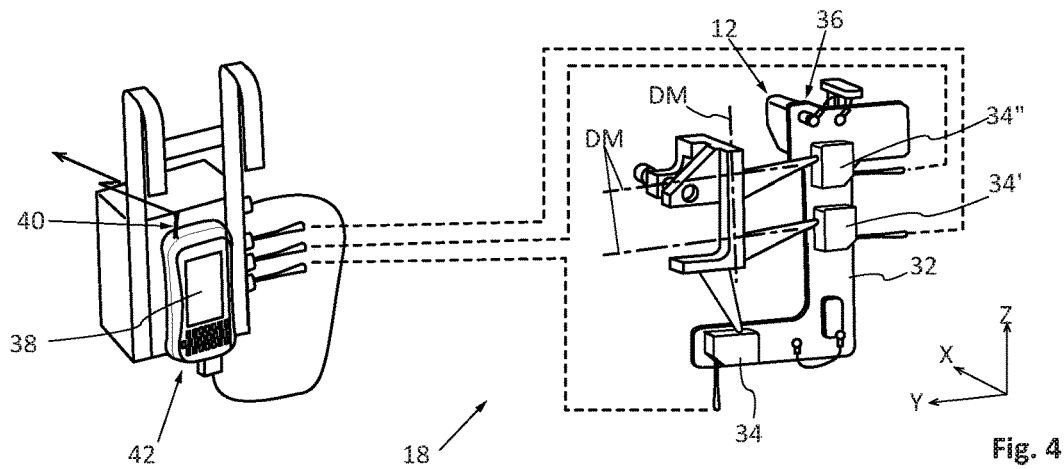
FIG. 4 is a schematic of an adjustment tool which illustrates an embodiment of the invention.

As shown in FIG. 4, each adjustment tool 18 comprises a support 32, at least one measurement sensor 34 that is attached to the support 32 and is oriented toward the structural element 14, and a removable connection system 36 by means of which it is possible to connect the support 32 to the structure 12.

According to one embodiment, the removable connection system 36 comprises through-holes passing through the support, and screws which pass through the support 32 via the through-holes and which screw into bores provided in the structure 12. Other solutions for the removable connection system 36 are conceivable. In any case, the removal connection system 36 is configured to temporarily secure the support 32 to the structure 12, and to immobilize the support in the aircraft reference frame XYZ.

According to one embodiment, each measurement sensor 34 is an optoelectronic sensor. In contrast to a laser tracker, a measurement sensor 34 is configured to measure a distance at short range, of the order of a few centimeters. This makes it possible to use, simultaneously and in a confined space, multiple adjustment tools 18 and thus to simultaneously adjust the position of multiple structural elements 14.

The measurement sensor 34 is configured to measure, in a measurement direction DM, a variation in the distance separating the measurement sensor 34 and the structural element 14.

According to certain embodiments shown in FIGS. 4, 5, 6, 9, the support 32 is a flat plate arranged, in operation, in a transverse plane (perpendicular to the X-axis).

Figure 8:
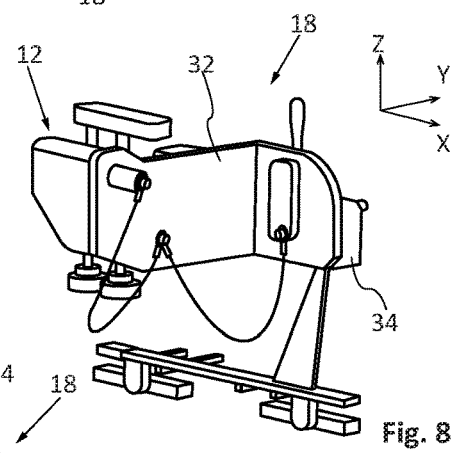
Figure 9:
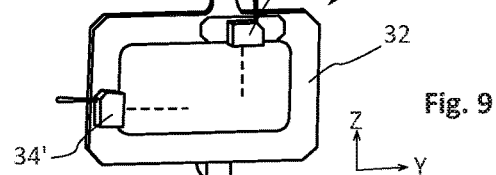

According to other embodiments shown in FIGS. 8 and 9, the support is a plate bent into an L shape with, in operation, a first leg arranged in a plane perpendicular to the X-axis and a second leg arranged in a plane perpendicular to the Y-axis.

In the case of a structural element having at least one adjustment direction DR, the support 32 has a suitable geometry and each measurement sensor is secured to the support 32 such that the measurement direction DM of each measurement sensor 34 is oriented parallel to a component of one of the adjustment directions DR of the structural element 14.

Preferably, the support 32 has a suitable geometry and each measurement sensor is secured to the support 32 such that the measurement direction DM of the measurement sensor 34 coincides with one of the adjustment directions DR of the structural element.

In the case of a structural element having at least one adjustment orientation OR, the support has a suitable geometry and each measurement sensor is secured to the support 12 such that the measurement direction DM of each measurement sensor 34 is not parallel to, preferably is perpendicular to, and does not intersect the axis of rotation AR of the adjustment orientation OR.

According to a first embodiment shown in FIG. 4, the support 32 comprises a flat L-shaped plate having three measurement sensors 34, 34', 34" whose measurement directions are arranged in a transverse plane, a first measurement sensor 34 with a measurement direction parallel to the Z-axis and two measurement sensors 34', 34" with measurement directions parallel to the Y-axis and offset in the Z-axis.

Figure 5:
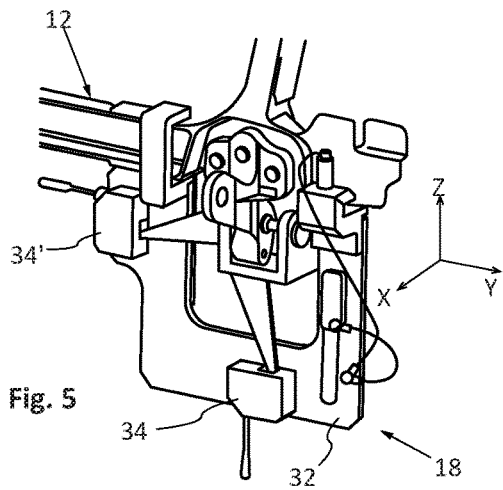
FIGS. 5 to 9 are schematics of adjustment tools which illustrate embodiments of the invention.
Figure 6:
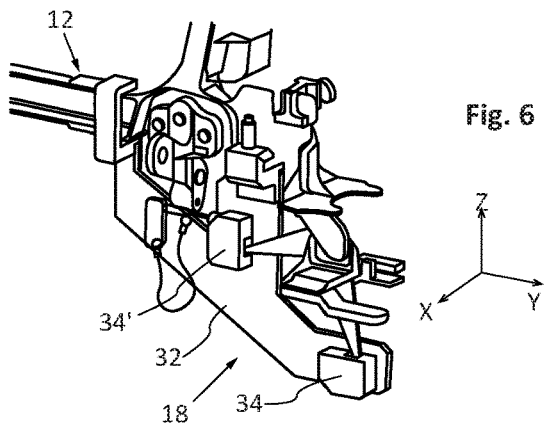

According to second and third embodiments shown in FIGS. 5 and 6, the support 32 comprises a flat plate with two measurement sensors 34, 34', a first measurement sensor 34 with a measurement direction parallel to the Z-axis and a second measurement sensor 34' with a measurement direction parallel to the Y-axis.

Figure 7:
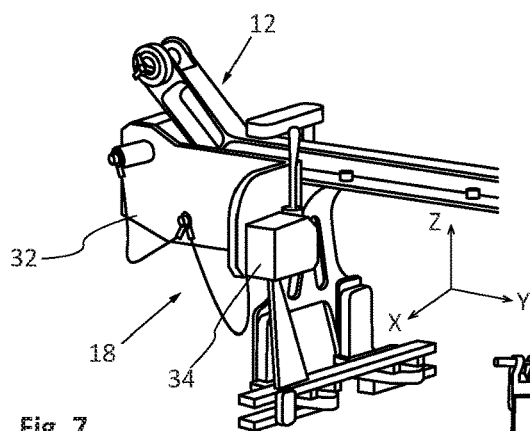

According to fourth and fifth embodiments shown in FIGS. 7 and 8, the support 32 comprises a plate bent into an L shape, of which one of the legs supports a measurement sensor 34 with a measurement direction parallel to the Z-axis.

According to a sixth embodiment shown in FIG. 9, the support 32 comprises a flat plate in the shape of a frame, with two measurement sensors 34, 34', a first measurement sensor 34 with a measurement direction parallel to the Z-axis and a second measurement sensor 34' with a measurement direction parallel to the Y-axis.

Advantageously, as shown in FIG. 4, each adjustment tool 18 comprises a man-machine output interface 38 that is configured to output the values measured by each measurement sensor 34 of the adjustment tool 18, such as for example a screen or loudspeakers. An interface 38 of this kind is configured to output the adjustment value(s) determined for the structural element 14 in question. When such an interface 38 is a screen, it displays the adjustment value(s) determined.

According to another feature, the adjustment tool 18 comprises a calculator by means of which it is possible to compare the values measured by each measurement sensor 34 with the adjustment values determined, and to derive corrective actions to be carried out in order to finalize adjustment of the structural element 14. The corrective actions are, by way of example, translations of the structural element in a given direction and by a given distance, and/or rotations of the structural element by a given angle about a given axis of rotation. Such corrective actions can then be output by the man-machine output interface 38.

According to another feature, the adjustment tool 18 comprises a communication system 40 for exchanging information with a remote computer such as the computer 31 intended for storage and management of the third database 28. Thus, a report of the adjustment operations can be sent by the communication system 40 to the computer 31 to be stored there, after being prepared by the adjustment tool 18. The communication system 40 also permits communication between the adjustment tool 18 and the measurement tool 16 and makes it possible to transmit, by way of example, the adjustment values determined by the measurement tool 16.

According to one embodiment, the adjustment tool 18 comprises a pocket computer 42 of the PDA (personal digital assistant) type which incorporates the screen 38, the calculator and the communication system 40. This pocket computer 42 is preferably connected via at least one wired connection 44 to the measurement sensors 34, 34', 34".

In the third step of adjusting each structural element 14, each operator secures an adjustment tool 18 close to the structural element 14. The screen 38 of the adjustment tool 18 provides the operator with the adjustment values determined as a function of the comparison between the values of the theoretical position and the values of the actual position measured using the measurement tool 16. As a variant, the screen 38 can indicate, to the operator, corrective actions such as have been defined previously.

The operator changes the actual position of the structural element 14 until the values measured by the measurement sensors 34 of the tool match the adjustment values. Once the values measured by the measurement sensors 34 of the tool are equal to the adjustment values, the structural element is correctly positioned. After adjustment, the adjustment tool 18, using the communication system 40, can send to the computer 31 an adjustment report which is stored in a database.

The operator can then remove the adjustment tool 18 and install the same adjustment tool or another adjustment tool close to another structural element.

According to the invention, multiple operators can work simultaneously and each adjust a structural element 14. This makes it possible to adjust all of the structural elements in 3 or 4 hours. The use of photogrammetry during the first measurement step means that the vibration-related constraints of the prior art are no longer an issue, making it possible to increase the number of operators present in the working area.

According to one variant of the invention, the changing of the actual position of the structural element 14 can be automated. The adjustment device can then send the determined adjustment value(s) and/or the determined corrective action(s) for the structural element 14 in question to automated positioning means or actuators known to a person skilled in the art, such as, by way of non-limiting example, automated robots for moving, lifting and/or changing the orientation of a structural element 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for adjusting a position of structural elements of a structure of an aircraft, comprising:
   a measurement tool comprising:
      at least one pair of imaging devices configured to capture an image of the structural elements;
      an analysis system configured to determine, from the images captured by the imaging devices, a value for an actual position of each structural element;
   a processing and calculation system configured to compare each value of the actual position determined by the analysis system with a corresponding theoretical value, and to determine therefrom an adjustment value;
   an adjustment tool configured to be attached in use to a structural element, comprising:
      at least one measurement sensor configured to measure a distance between said measurement sensor and the structural element, and
      a calculator configured to compare a value measured by the measurement sensor with a corresponding adjustment value, and to derive therefrom corrective actions to finalize adjustment of the structural element.

2. The device as claimed in claim 1, wherein the device further cooperates with automated positioning means.

3. The device as claimed in claim 1, wherein the device comprises an output interface for outputting the adjustment value.

4. The device as claimed in claim 3, wherein the output interface comprises a man-machine output interface in the form of a screen.

5. The device as claimed in claim 1, wherein the adjustment tool comprises a support on which the at least one measurement sensor is attached, and a removable connection system by means of which it is possible to connect said support to the structure, said measurement sensor pointing toward the structural element.

6. The device as claimed in claim 5, wherein the adjustment tool comprises at least two measurement sensors, each measurement sensor being attached to the support such that the direction of measurement of each measurement sensor is neither parallel with nor intersects an axis of rotation of an adjustment orientation of a structural element.

7. The device as claimed in claim 1, wherein the processing and calculation system is a computer which can also act as the analysis system.

8. The device as claimed in claim 1, wherein the measurement tool comprises two pairs of imaging devices.

9. The device as claimed in claim 1, wherein the measurement sensor is an opto-electrical sensor.

10. A method for adjusting the position of structural elements of a structure of an aircraft, implemented by a device for adjusting a position of structural elements of a structure of an aircraft, the device comprising:
 a measurement tool comprising:
  at least one pair of imaging devices configured to capture an image of the structural elements;
  an analysis system configured to determine, from the images captured by the imaging devices, a value for an actual position of each structural element;
 a processing and calculation system configured to compare each value of the actual position determined by the analysis system with a corresponding theoretical value, and to determine therefrom an adjustment value;
 an adjustment tool configured to be attached in use to a structural element, comprising:
  at least one measurement sensor configured to measure a distance between said measurement sensor and the structural element, and
  a calculator configured to compare a value measured by the measurement sensor with a corresponding adjustment value, and to derive therefrom corrective actions to finalize adjustment of the structural element,
wherein the method comprises the following steps:
 determining a value for the actual position of structural elements of the aircraft structure by means of the measurement tool;
 determining at least one adjustment value on the basis of the previously determined value of the actual position and a theoretical position of a structural element, by means of the processing and calculation system;
 measuring, by means of the adjustment tool, a distance between a measurement sensor and the structural element, and comparing this value with the adjustment value, and deriving corrective actions until the values measured by each measurement sensor match the determined adjustment values.

11. The method as claimed in claim 10, further comprising a step of sending the adjustment values to automated positioning means.

12. The method as claimed in claim 10, further comprising a step of drawing up a report of the adjustment operations when the values measured by each measurement sensor matches the determined adjustment values.

13. The method as claimed in claim 10, further comprising a step of outputting at least one of the adjustment value or the report of the adjustment operations by means of a man-machine output interface.

* * * * *